(12) United States Patent
Crawford

(10) Patent No.: US 7,832,077 B2
(45) Date of Patent: Nov. 16, 2010

(54) METHOD OF MANUFACTURING A COILED TUBING SYSTEM

(76) Inventor: Joe Crawford, P.O. Box 476, Crane, TX (US) 79731

( * ) Notice: Subject to any disclaimer, the term of this patent is extended or adjusted under 35 U.S.C. 154(b) by 1152 days.

(21) Appl. No.: 11/320,511

(22) Filed: Dec. 28, 2005

(65) Prior Publication Data

US 2006/0213247 A1    Sep. 28, 2006

Related U.S. Application Data

(60) Provisional application No. 60/651,873, filed on Feb. 8, 2005.

(51) Int. Cl.
 B21D 39/00   (2006.01)
 B21C 37/06   (2006.01)
(52) U.S. Cl. .......................... 29/514; 72/368
(58) Field of Classification Search .............. 29/514, 29/433, 819, 821, 241, 771, 779, 783, 820, 29/33 B, 33 Q, 33 S; 72/368; 138/116, 100, 138/150, 151, 154, 171; 166/384, 385, 65.1, 166/77.1; 228/148, 17, 222, 147, 5.7, 47.1
See application file for complete search history.

(56) References Cited

U.S. PATENT DOCUMENTS

| | | |
|---|---|---|
| 1,851,801 A | 3/1932 | Boone |
| 2,162,748 A | 6/1939 | Richards et al. |
| 2,361,195 A | 10/1944 | Grebe |
| 2,371,704 A | 3/1945 | Nichols |
| 2,751,144 A | 6/1956 | Troendle |
| 2,853,016 A | 9/1958 | Furrer |
| 2,948,224 A | 8/1960 | Bailey et al. |
| 4,214,854 A | 7/1980 | Roeder |
| 4,372,389 A | 2/1983 | Hamrick et al. |
| 4,383,803 A | 5/1983 | Reese |
| 4,386,654 A | 6/1983 | Becker |
| 4,403,919 A | 9/1983 | Stanton et al. |
| 4,405,291 A | 9/1983 | Canalizo |
| 4,462,763 A | 7/1984 | MacLeod |
| 4,476,923 A | 10/1984 | Walling |
| 4,552,299 A * | 11/1985 | Sendzimir .............. 228/5.7 |

(Continued)

FOREIGN PATENT DOCUMENTS

EP    1041243 A2    10/2000

(Continued)

OTHER PUBLICATIONS http://www.contdisc.com/faqs/faqs.htm; "Frequently Asked Questions; Rupture Disc"; Continental Disc Corporation; webpage accessed Dec. 12, 2007 (4 pages).

(Continued)

*Primary Examiner*—John C Hong
(74) *Attorney, Agent, or Firm*—Cox Smith Matthews Incorporated

(57) ABSTRACT

A method of manufacturing a coiled tubing system may involve introducing a first continuous length of coiled tubing onto a surface of a continuous length of flat metal, arranging the first coiled tubing such that the longitudinal axis of the first coiled tubing is parallel to the sides of the flat metal, fixing the first coiled tubing along the length of the surface of the flat metal, and forming the flat metal into a second continuous length of coiled tubing that contains the first coiled tubing.

1 Claim, 2 Drawing Sheets

U.S. PATENT DOCUMENTS

| | | | |
|---|---|---|---|
| 4,553,910 A | 11/1985 | Gosschalk | |
| 4,706,747 A | 11/1987 | Schneider | |
| 4,778,355 A | 10/1988 | Holland | |
| 4,863,091 A | 9/1989 | Dubois | |
| 5,069,602 A | 12/1991 | Gipson | |
| 5,104,296 A | 4/1992 | Roeder | |
| 5,188,517 A | 2/1993 | Koster | |
| 5,191,911 A | 3/1993 | Dubois | |
| 5,222,867 A | 6/1993 | Walker, Sr. et al. | |
| 5,343,945 A | 9/1994 | Weingarten et al. | |
| 5,431,228 A | 7/1995 | Weingarten et al. | |
| 5,494,102 A | 2/1996 | Schulte | |
| 5,794,697 A | 8/1998 | Wolflick et al. | |
| 5,946,788 A * | 9/1999 | Griffioen et al. | 29/433 |
| 5,950,298 A * | 9/1999 | Griffioen et al. | 29/433 |
| 6,298,917 B1 | 10/2001 | Kobylinski et al. | |
| 6,454,010 B1 | 9/2002 | Thomas et al. | |
| 6,601,651 B2 | 8/2003 | Grant | |
| 6,623,252 B2 | 9/2003 | Cunningham | |
| 7,165,952 B2 | 1/2007 | Crawford | |
| 2003/0116212 A1 | 6/2003 | Thomson | |
| 2003/0196797 A1 | 10/2003 | Crawford et al. | |
| 2006/0000616 A1 | 1/2006 | Crawford | |
| 2006/0060358 A1 | 3/2006 | Crawford | |
| 2006/0127226 A1 | 6/2006 | Crawford | |
| 2006/0213247 A1 | 9/2006 | Crawford | |
| 2006/0213666 A1 | 9/2006 | Crawford | |

FOREIGN PATENT DOCUMENTS

| | | |
|---|---|---|
| GB | 2362901 A | 12/2001 |
| WO | 03089753 A2 | 10/2003 |
| WO | 2006078377 A1 | 7/2006 |
| WO | 2006081095 A2 | 8/2006 |
| WO | 2006086143 A2 | 8/2006 |

OTHER PUBLICATIONS http://www.rupturedisk.com/Products/Oseco/holders/holders.htm; "Insert Rupture Disk Holders from Oseco"; Advanced Rupture Disk Technology, Inc.; webpage accessed Feb. 11, 2008 (4 pages).

http://www.rupturedisk.com/Products/Oseco/oseco.htm; "Oklahoma Safety Equipment Company (OSECO)"; Advanced Rupture Disk Technology, Inc.; webpage accessed Feb. 11, 2008 (7 pages).

http://www.mpipressure.com/extruderrupturedisk.html; "MPI Extruder Rupture Disks—MPI"; MPI Melt Pressure; webpage accessed Feb. 14, 2008 (9 pages).

http://news.thomasnet.com/fullstory/458629; "Rupture Disk Holder Withstands Corrosive Conditions"; ThomasNet Industrial NewsRoom; webpage accessed Feb. 14, 2008 (5 pages).

http://www.mpipressure.com/extruderrupturedisc.html; "MPI Extruder Rupture Discs—MPI"; MPI Melt Pressure; webpage accessed Dec. 12, 2007 (3 pages).

Baker Hughes; "Coiled Tubing Solutions, Solve Downhole Problems with Reliable, Cost-Effective Technology"; Baker Oil Tools (no date) (78 pages).

"Rupture Disk Assemblies", Westermeyer Industries, Inc. (no date) (1 page).

http://www.hfpumps.com/p_i.html; "H-F Valve Cup Plunger"; Harbison-Fischer Mfg. Co.; webpage accessed Dec. 12, 2007 (1 page).

http://www.hfpumps.com/p_bs_b.html; "Carbide"; Harbison-Fischer Mfg. Co.; webpage accessed Dec. 12, 2007 (1 page).

http://www.hfpumps.com/p_bs_c.html; "Standard Stainless"; Harbison-Fischer Mfg. Co.; webpage accessed Dec. 12, 2007 (1 page).

http://www.hfpumps.com/p_access_a.html; "Sucker Rod Guides"; Harbison-Fischer Mfg. Co.; webpage accessed Dec. 12, 2007 (1 page).

http://www.hfpumps.com/p_access_i.html; "Sucker Rod, Polished Rod, and Combination Couplings"; Harbison-Fischer Mfg. Co.; webpage accessed Dec. 12, 2007 (1 page).

http://www.hfpumps.com/p_accessed_1.html; "Strainer Nipples and Gas Anchors"; Harbison-Fischer Mfg. Co.; webpage accessed Dec. 12, 2007 (1 page).

http://www.hfpumps.com/feat_prod.html; "Variable Slippage Pump"; harbison-Fischer Mfg. Co.; webpage accessed Dec. 12, 2007 (2 pages).

Precision HD Pumps "http://www.precisiondhpumps.com/barrels.htm" (May 4, 2004) [website is no longer available].

Thompson Pump Company "http://thompsonoilpump.com/pumps.html" (May 4, 2004) [website is no longer available].

* cited by examiner

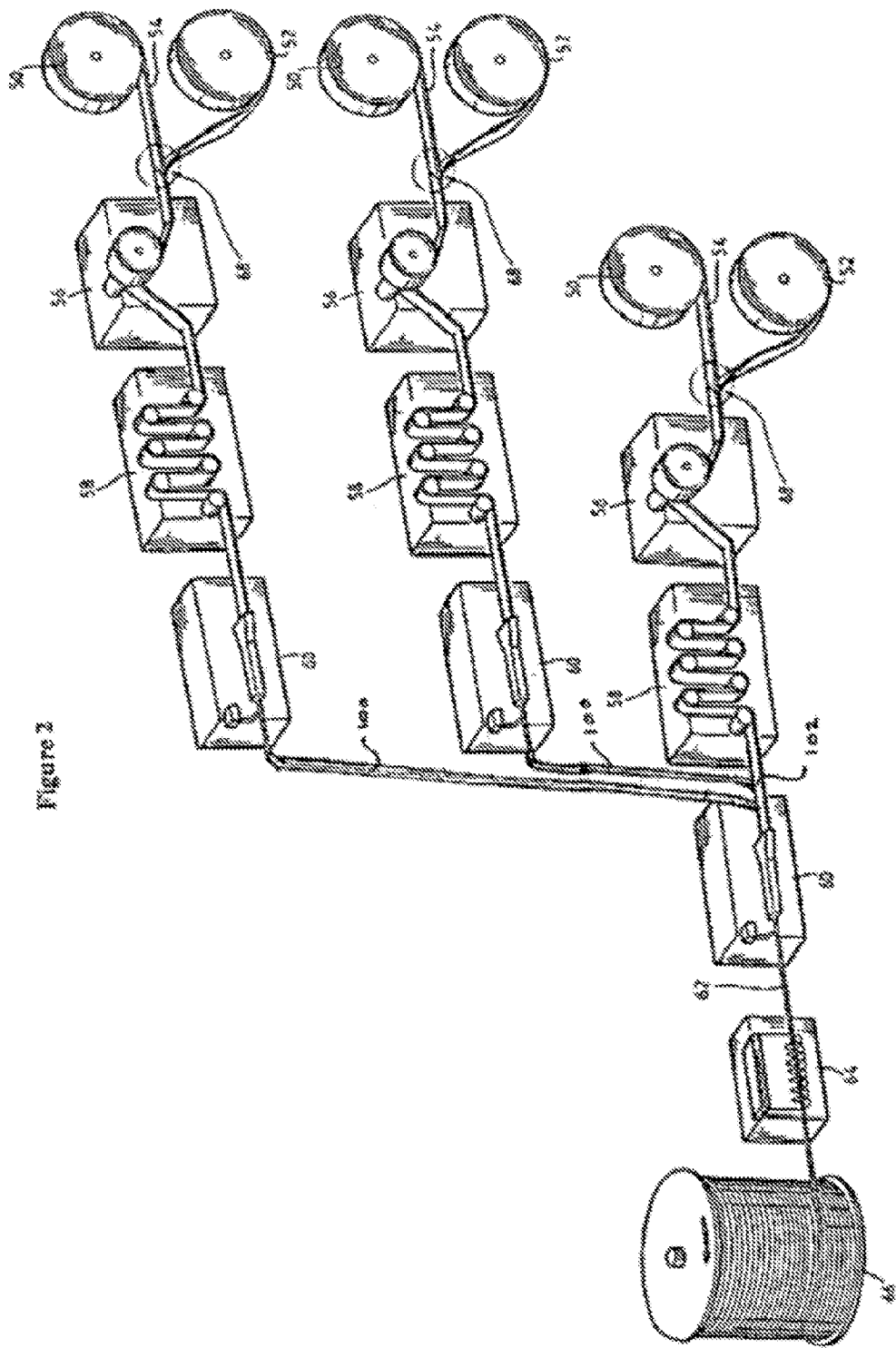

METHOD OF MANUFACTURING A COILED TUBING SYSTEM

CITATION TO PRIOR APPLICATION

This application claims the benefit of U.S. Provisional Application No. 60/651,873, filed on Feb. 8, 2005.

BACKGROUND OF THE INVENTION

1. Field of the Invention

The present invention generally relates to an improved oil well production tube system. More specifically, the present invention relates to an oil well production tube system where one or more smaller coilable power tubes is placed within a larger coilable production tube.

2. Background Information

The use of coilable production tubing for the transfer of fluid from a subterranean source to the surface is known in the art. However, such production tubing systems heretofore devised and utilized are known to consist basically of familiar, expected and obvious structural configurations, notwithstanding the several designs encompassed by the prior art which have been developed for the fulfillment of many objectives and requirements. While these devices may fulfill their respective, particularly claimed objectives and requirements, the aforementioned devices do not disclose an improved oil well production tube system such as Applicant's present invention.

Conventional artificial lift recovery systems employ a series of rigid, individual production tube segments joined to one another by threading each segment together. Typically, these segments are on the order of thirty feet in length. Each individual link is connected to the next so as to form a final production tube extending between the surface and bottom of a well. Several problems are unavoidable with systems employing this type of production tubing. For example, a rigid, segmented production tube is prone to leaking recovered fluid about the point where individual segments are joined together. These problems are exaggerated when a well bore becomes warped or deviated; as such, many times rigid segments cannot be used in multiple well bores. Further, individual production tube segments are subject to cross-threading or other thread damage that may compromise the mechanical integrity of the production tube. When this occurs, heavy machinery (capable of producing high torque) must be used to unthread or separate individual segments from one another. Finally, in the event the production tubing must be removed from the well bore, individual segments must be taken out of the ground in linear fashion, extending several feet above the surface, before they can be completely removed from the well.

Commonly, artificial lift recovery systems employ electrical cables to power a downhole pump. However, these types of systems present several problems. For instance, electrical cable must be strapped to the outside of each individual joint with bands or straps to hold the cable in place. This involves the use of at least two additional personnel and a spooling unit. One person is needed to run the banding machine that attaches the cable to the production tube and another person is needed to run the electrical cable spooling unit that contains the spool of electrical cable. Moreover, the cable itself must be sheathed in a protective shield, or armor, to protect against abrasions that might occur during installation. Even when this protection is utilized, cable damage can occur that causes an electrical short in the cable when power is applied. The production tube and cable must then be pulled from the well bore and repaired before it can be run back into the well bore.

It is not uncommon for the bands that hold electrical cable to break or be installed improperly. When this occurs, since the armored electrical cable is not capable of supporting its own weight for the entire length of the production assembly, other straps break, ultimately resulting in a cable failure. In such an event, cable recovery from the well bore is an expensive and often unsuccessful process. Additionally, occasionally the production tube disjoins and subsequently severs the electrical cable; of course, such a combination is especially difficult to retrieve from the well bore.

Other practical difficulties are associated with the use of electrical cables in artificial lift recovery systems. Specifically, as a result of gaps between the electrical cable and production tube, and the electrical cable and protective armor, current blowout preventers can not achieve a 100% positive seal. Moreover, in wells that have the potential for heavy flowing, brine water must be constantly pumped in the well bore while the pump is being installed. Also, the well bore inside diameter must be large enough to house both the production tube and the electrical cable, which of course, limits the installing of large capacity pumps in smaller diameter well bores.

In view of the preceding, Applicant submits that hydraulically powered downhole pumping systems are much more effective. Nevertheless, seemingly unavoidable problems are a major concern for those skilled in the art. Use of a single coilable production tube provides no means for efficient hydraulic power communication between the surface and a downhole recovery device. Specifically, the use of coliable production tube, alone, does not provide for efficient or reliable power communication between the surface and a downhole recovery device. Limitations of known coilable tube production systems are also grounded in their manufacturing process. Known coilable production tube manufacturing processes do not lend themselves to placing smaller coilable, power tubes within a larger coilable production tube. Specifically, no fabrication process has been developed to allow for such a configuration. In the alternative, continuous power tube may be "guided" along the production tube from surface to downhole. However, this procedure is far from practical as binding, kinking, and sliding friction make for an all to difficult task.

SUMMARY OF THE INVENTION

The general purpose of the present invention, which will be described subsequently in greater detail, is to provide an improved downhole recovery production tube system which has many of the advantages of such systems known in the art and many novel features that result in a new downhole recovery production tube system which is not anticipated, rendered obvious, suggested, or even implied by any of the known systems, either alone or in any combination thereof.

In view of the preceding, Applicant's invention addresses problems associated with enabling power communication between the surface and a downhole recovery means of an oil or gas recovery system. The invention employs use of one or more coilable power tubes placed within a larger coilable production tube. For example, two smaller coiled tubing tubes may be placed inside the larger coiled production tube, such as two ¾" tubes inside a 2" coiled production tube.

Use of the present system would offer several advantages over current systems. For instance, conventional, double-derrick, work-over rigs currently utilized to remove and install jointed tubing strings from the well bore would no longer be necessary in production operations. The proposed hydraulically operated pumping systems utilize a mast mounted coiled tubing unit to install the pumping components. Pump installation time is reduced by at least 50%, simply due to not having to screw together several joints of conventional production tubing. The coiled tubing unit has a spool containing the coiled production tube with the two coiled tubing power strings already installed inside. Pump installation involves the following steps:

1. Move in and rig up a mast mounted coiled tubing unit. Install blowout preventer utilizing hoist mounted on the coiled tubing mast.
2. Pick up pump and secure it in the top of the well bore utilizing the same hoist.
3. Connect production coiled tubing and internal, coiled, hydraulic lines to the downhole pump.
4. Purge hydraulic lines of all air. Test connection where production tubing is installed.
5. Lower pump and production assembly into the well bore to the desired depth.
6. Land production coiled tubing in surface well head.
7. Remove the blowout preventer.
8. Install power lines to hydraulic pump and production lines to production tubing.

Because the power strings are inside the production tubing, blowout preventers have the "slick" outside surface of the production tubing to obtain a 100% seal. In the instance the production tube should separate, the smaller inner diameter power strings remain protected inside the production tube, making the production tube much easier to retrieve from the well bore. The two power strings are effectively shielded from any abrasion that might occur during installation operations. Because there is no outside power cable, smaller diameter well bores will be able to run larger pumping systems.

As will be discussed, the preferred form of the present invention incorporates use of coilable tubing made from flat stock metal where adjoining ends of stock metal segments, cut at supplementary angles, are consecutively joined. The attributes associated with such process allow fabrication of a tubing string of up to 20,000 feet in length or more in a single pass operation. This process, preferably used to fabricate coilable tubing of the present system, is described in U.S. Pat. No. 4,863,091; and the coilable tubing preferably used in the present system is described in U.S. Pat. No. 5,191,911. Each are hereby expressly incorporated by reference.

The coiled tubing and associated fabrication process described in the above-referenced documents teach a continuous coilable tube formed by joining consecutive lengths of stock metal. Stock metal lengths are joined together at supplemental angles, preferably of 30 degrees, and welded together with the aid of "wings" acting as heat sinks. The adjoining weld is machined and then sent through a normalizing heat treatment process. Finally, the joined lengths are formed and welded in longitudinal fashion to form a continuous tube. Extraordinary strength and flexibility of the tube is provided by the helical weld about the metal stock lengths.

Unlike what is known in the art, the present system employs use of adjacent fabrication systems whereby one or more smaller tubes are formed. These smaller tubes undergo welding, machining, and normalization procedures as known in the art. However, unlike that taught in the prior art, the smaller tubes are adjacently placed lengthwise along a strip of joined stock metal having a relatively large width (thereby providing for a tube of larger circumference). Preferably, the smaller tubes are introduced to an assembly line with the large stock metal strip after the welded joints between large strip segments has gone through the normalization process. As such, the smaller tubes may rest along the larger stock metal strip lengths where one or more smaller tubes, in combination with the large stock metal, enter a tube former as known in the art. When the strip stock, having the smaller tubes resting thereon, reaches the tube former, it is shaped into tubular form with a seam running along its length. This seam is welded and the resulting tube is then sent on to further processing, such as heat or electrochemical treatment.

Importantly, the smaller power tubes must be spaced with respect to one another along the large stock metal surface so that as the large tube is formed with the smaller tubes contained therein, the smaller tubes remain appropriately aligned with respect to one another. Correct spacing of the smaller tubes can be determined given the circumference of each smaller tube, and the circumference of the larger tube. More specifically, the smaller tubes should not be pressed against one another so as to compress or deform the smaller tubes. Preferably, each smaller tube is welded to the large stock metal strip surface in interval fashion. This weld may be a simple tack-weld and is meant to ensure the smaller tubes do not bind or "wrap around" the interior of the larger production tube during coiling and uncoiling. Perhaps most importantly, however, securing the smaller tubes along the interior of the larger tube eliminates unstabilizing movement of the power tubes created in response to forces created by hydraulic fluid circulating there-through.

The novel attributes of the present system are apparent in both manufacture and operation of the present system. The method of manufacture associated with the present system provides for fabrication of an extraordinarily long, continuous series of coilable tubes in a single pass. This feature, not available with known systems, provides for savings in terms of both cost and time. A number of smaller tubes may be independently introduced and arranged upon the larger strip metal surface. The larger strip surface is then formed into a larger tube irrespective of the number of tubes contained therein. As a result, a larger coilable tube, containing a plurality of smaller coilable tubes, is formed a single pass procedure. This is particularly important as the production time of a tube containing many smaller tubes is exactly that of a tube containing one smaller tube.

During operation, the smaller coilable tubes house power communication means, either electrical or hydraulic, that extend between the surface and a downhole recovery unit. For example, arrangement of the smaller tubes within a larger tube provides an excellent mechanism for the transfer of hydraulic power fluid, which is thought to be most beneficially used where a submersible, hydraulically actuated, recovery means is placed downhole. The system also makes it possible to safely extend electrical power lines between the surface and an electrically driven recovery means without being exposed to harmful agents.

Unlike systems known in the art, the present invention provides a system whereby electrical power lines can extend between surface and downhole in a safe, sealed environment. Where known systems employ a single tube extending between surface and downhole, electrical power lines extend in exposed fashion along the interior or exterior of the production tube. In either case, the power lines remain in a precarious situation as they are exposed to corrosive materials, possible abrasions, and are subject to being damaged by warping deviation of the well bore. However, the present system allows electrical power lines to remain protected in small coiled tubes along the interior of the production tube.

BRIEF DESCRIPTION OF THE DRAWINGS

Applicant's invention may be further understood from a description of the accompanying drawings, wherein unless otherwise specified, like referenced numerals are intended to depict like components in the various views.

FIG. 2 is a perspective view of the preferred embodiment of the present invention.

DETAILED DESCRIPTION OF THE PREFERRED EMBODIMENT

Figure 1:
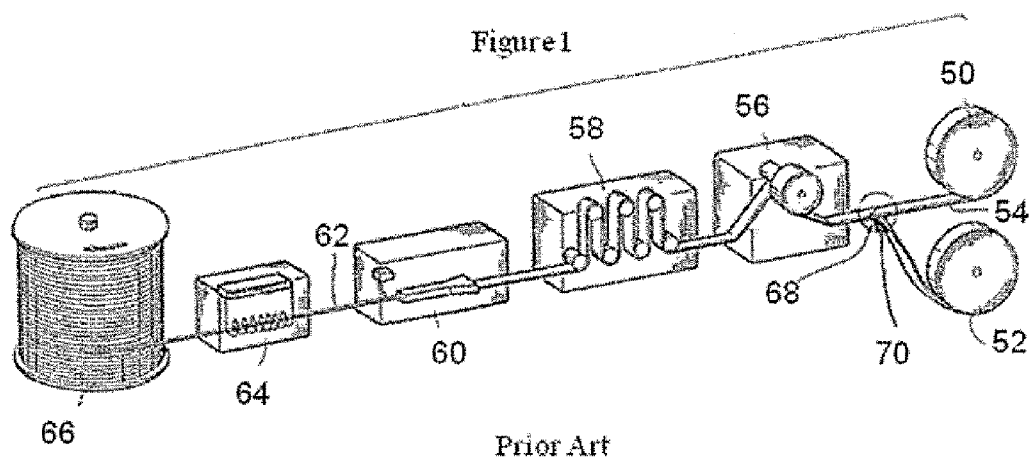
FIG. 1 is a perspective view of a known system for producing seamless coilable tubing.

Referring to FIG. 1, a prior art system of producing a tubing string from flat sheet metal strips is shown. Such is disclosed in U.S. Pat. Nos. 4,863,091 and 5,191,911, each of which is hereby expressly incorporated by reference. In this system, the apparatus includes master coils 50 and 52, stock metal 54, an accumulator 56, a feed stock conditioner 58, a tube former 60, tubing 62, a heat treater 64, and a reel 66. As known in the art, stock metal 54 is deployed from master coils 50 and 52 and is "run through" accumulator 56. Differential action on the part of accumulator 56 allows a second length of strip stock to be spliced onto the trailing end of a preceding length while the latter is still housed in accumulator 56. Splice 68 is formed by cutting strip ends to be spliced at supplementary angles, including an acute angle of about thirty degrees. A small piece 70 is attached to each end of splice joint 68 to act as a heat sink and provide for improved weld strength. A welding tool is passed along the splice 68. After splice joint 68 has been welded the joint is machined or finished to remove excess weldment, this is typically done with grinders applied to each surface of the joined strips. After grinding, the weld is normalized by some normalizing means. Normalizing means preferably is a resistance heater as known in the art. Application of normalizing means varies according to desired application of the produced tubing string. The strip stock then reaches tube former 60 and is shaped into tubular form with a seam running along its length. The welded tubing then passes immediately to heat treater 64. Finally, from the heat treater 64 the tubing is reeled onto storage reel 66.

Referring to FIG. 2, an embodiment of the system of the present invention is depicted. One or more apparatuses are shown for producing coilable tubing. Importantly, several apparatuses may be arranged with respect to the other so that a single, larger coilable tube may be produced containing a different number of smaller tubes therein with no reconfiguration of any apparatus. As mentioned, concurrent and independent operation of each apparatus provides for a time and costs saving not yet achieved in the art. As shown, any number of smaller coilable tubes, generally designated by the reference numeral 100, is introduced to the surface of strip 102. In the preferred embodiment, each tube 100 is introduced to strip 102 after strip 102 has passed through stock conditioner 58 but before strip 102 enters tube former 60.

Preferably, each tube 100 is intermittently welded to the surface of strip 102 so that each remains longitudinally fixed with respect to strip 102. Each weld is then machined, by grinder or the like, so as to form an even seam between each tube. This, of course, promotes even flow of production fluid and efficient operation. Each tube 100 is spaced from the other so that as strip 102 is formed into a tube by tube former 60, each tube 100 is not unduly pressed against the other. Such an arrangement, however, does provide for each tube 100 to be arranged in adjacent fashion within the larger coiled tube. As mentioned, welding each tube 100 to the surface of strip 102 provides for several benefits, including efficient operation and the prevention of bending or kinking of component tubes.

The physical configuration of the present apparatus lends itself to a novel process of installing, or initiating operation of an artificial lift recovery system. This process, in conjunction with production tube described herein, provides for tremendous savings with regard to time and money. Accordingly, a downhole recovery pump installation would use the following steps:

1. Move in and rig up mast mounted coiled tubing unit. Install blowout preventer utilizing hoist mounted on the coiled tubing mast.
2. Pick up pump and secure in the top of well bore utilizing the same hoist.
3. Connect production coiled tubing and internal, coiled, hydraulic lines to the downhole pump.
4. Purge hydraulic lines of all air. Test connection where production tubing is installed.
5. Lower pump and production assembly into the well bore to desired depth.
6. Land production coiled tubing in surface wellhead.
7. Remove blowout preventer.
8. Install power lines to hydraulic pump and production lines to production tubing.

Although the present invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A method of manufacturing a coiled tubing system comprising:

introducing a first continuous length of coiled tubing onto a surface of a continuous length of flat metal;

arranging said first continuous length of coiled tubing onto said surface of said continuous length of flat metal such that the longitudinal axis of said first continuous length of coiled tubing is parallel to the sides of said continuous length of flat metal;

fixing said first continuous length of coiled tubing along the length of said surface of said continuous length of flat metal; and forming said continuous length of flat metal into a second continuous length of coiled tubing wherein said first continuous length of coiled tubing is fixedly contained within said second continuous length of coiled tubing.

* * * * *

UNITED STATES PATENT AND TRADEMARK OFFICE
CERTIFICATE OF CORRECTION

| | | |
|---|---|---|
| PATENT NO. | : 7,832,077 B2 | Page 1 of 1 |
| APPLICATION NO. | : 11/320511 | |
| DATED | : November 16, 2010 | |
| INVENTOR(S) | : Joe Crawford | |

It is certified that error appears in the above-identified patent and that said Letters Patent is hereby corrected as shown below:

On the title page item [56]

In References Cited, cancel "Precision HD Pumps "http://www.precisiondhpumps.com/barrels.htm" (May 4, 2004) [website is no longer available]." and insert the following:

Precision DH Pumps "http://www.precisiondhpumps.com/barrels.htm" (May 4, 2004) [website is no longer available].

In References Cited, FOREIGN PATENT DOCUMENTS, "WO 03089753 A2 10/2003" should be changed to --WO 2003089753 A2 10/2003--.

Signed and Sealed this
Sixth Day of September, 2011

David J. Kappos
*Director of the United States Patent and Trademark Office*